(12) United States Patent
Yano et al.

(10) Patent No.: US 11,915,430 B2
(45) Date of Patent: Feb. 27, 2024

(54) IMAGE ANALYSIS APPARATUS, IMAGE ANALYSIS METHOD, AND STORAGE MEDIUM TO DISPLAY INFORMATION REPRESENTING FLOW QUANTITY

(71) Applicant: CANON KABUSHIKI KAISHA, Tokyo (JP)

(72) Inventors: Kotaro Yano, Tokyo (JP); Hajime Muta, Zama (JP); Yasuo Bamba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 17/016,067

(22) Filed: Sep. 9, 2020

(65) Prior Publication Data
US 2021/0082127 A1 Mar. 18, 2021

(30) Foreign Application Priority Data
Sep. 13, 2019 (JP) ................... 2019-167189

(51) Int. Cl.
*G06T 7/215* (2017.01)
*G06T 3/40* (2006.01)
(Continued)

(52) U.S. Cl.
CPC ............. *G06T 7/215* (2017.01); *G06T 3/40* (2013.01); *G06T 7/269* (2017.01); *G06F 3/14* (2013.01);
(Continued)

(58) Field of Classification Search
CPC ............. G06F 3/14; G06T 2207/20021; G06T 2207/20084; G06T 2207/20092;
(Continued)

(56) References Cited

U.S. PATENT DOCUMENTS 6,185,314 B1 * 2/2001 Crabtree .......... G08B 13/19608
348/700
6,263,088 B1 * 7/2001 Crabtree .......... G08B 13/19602
382/104
(Continued)

FOREIGN PATENT DOCUMENTS

JP 2010-198566 A 9/2010
JP 2012-22370 A 2/2012
(Continued)

OTHER PUBLICATIONS

Walach et al., "Learning to Count with CNN Boosting", Sep. 2016, Springer.com (Year: 2016).*
(Continued)

*Primary Examiner* — Zhiyu Lu
(74) *Attorney, Agent, or Firm* — CANON U.S.A., INC. IP Division

(57) ABSTRACT

An image processing apparatus includes an acquisition unit, a setting unit, and a display unit. The acquisition unit is configured to acquire captured time-series images. The setting unit is configured to set a direction of measuring a flow quantity of targets in the time-series images. The display unit is configured to display information representing the flow quantity of the targets that is estimated based on a plurality of images acquired from the time-series images and the direction of measuring the flow quantity, together with information indicating the direction of measuring the flow quantity.

20 Claims, 9 Drawing Sheets

(51) Int. Cl.
*G06T 7/269* (2017.01)
*G06F 3/14* (2006.01)

(52) U.S. Cl.
CPC ............. *G06T 2207/20021* (2013.01); *G06T 2207/20084* (2013.01); *G06T 2207/20092* (2013.01); *G06T 2207/30196* (2013.01); *G06T 2207/30242* (2013.01)

(58) Field of Classification Search
CPC . G06T 2207/30196; G06T 2207/30242; G06T 3/40; G06T 7/215; G06T 7/269; G06V 20/53; G06V 10/82
See application file for complete search history.

(56) References Cited

U.S. PATENT DOCUMENTS

| | | | | |
|---|---|---|---|---|
| 6,295,367 | B1* | 9/2001 | Crabtree | G06T 7/162 382/103 |
| 2016/0224829 | A1* | 8/2016 | Chou | G06T 7/11 |
| 2016/0307049 | A1* | 10/2016 | Hagisu | G06F 21/6254 |
| 2016/0379049 | A1* | 12/2016 | Yu | G06K 9/6298 382/103 |
| 2017/0185828 | A1* | 6/2017 | Yamamoto | G06T 11/60 |
| 2017/0330330 | A1* | 11/2017 | Seki | G06T 7/254 |
| 2018/0005046 | A1* | 1/2018 | Miyano | G06T 7/246 |
| 2019/0012547 | A1* | 1/2019 | Togashi | G06V 40/173 |
| 2019/0026560 | A1* | 1/2019 | Nishikawa | G06T 7/70 |
| 2019/0102630 | A1* | 4/2019 | Bamba | G06T 11/206 |
| 2019/0333241 | A1* | 10/2019 | Yano | G08G 1/04 |
| 2020/0184229 | A1* | 6/2020 | Wu | G06T 11/206 |
| 2021/0279476 | A1* | 9/2021 | Nicholson | G06V 10/40 |

FOREIGN PATENT DOCUMENTS

| | | | | |
|---|---|---|---|---|
| JP | 2015-103104 | A | 6/2015 | |
| JP | 2017-118324 | A | 6/2017 | |
| JP | 2018-116692 | A | 7/2018 | |
| JP | WO2018131485 | | * 7/2018 | ............... G06T 7/60 |
| JP | 2018-180619 | A | 11/2018 | |
| JP | 2019067208 | | * 4/2019 | ............. G06F 18/23 |

OTHER PUBLICATIONS

Chuan Wang, et al.; "Deep People Counting in Extremely Dense Crowds;" Proceedings of the 23rd ACM International conference on Multimedia, 2015; pp. 1-4.

Elad Walach et al.; "Learning to Count with CNN Boosting;" Computer Vision - ECCV 2016. Lecture Notes in Computer Science, vol. 9906. Springer, Cham; pp. 1-17.

Di Kang et al.; "Incorporating Side Information by Adaptive Convolution;" Electronic Proceedings of the Neural Information Processing Systems Conference. Advances in Neural Information Processing Systems 30 (NIPS 2017); op. 1-11.

Toru Futatsugi et al.; "High Speed Massive People Counting Video Content Analysis Software;" Mar. 10, 2017.

* cited by examiner

IMAGE ANALYSIS APPARATUS, IMAGE ANALYSIS METHOD, AND STORAGE MEDIUM TO DISPLAY INFORMATION REPRESENTING FLOW QUANTITY

BACKGROUND

Technical Field

One disclosed aspect of the embodiments relates to a technology of analyzing a captured image.

Description of the Related Art

In recent years, there has been discussed a system that images a predetermined area using a camera and analyzes time-series images acquired by the imaging, thereby measuring the number of targets (e.g., human figures) in the image and analyzing the flow of target people. Such a system detects congestion in public space and determines a flow of people in the congestion. The system is therefore expected to be utilized for easing congestion at events and guiding evacuation in a disaster.

As a method of measuring the number of human figures in a captured image, the paper entitled "Deep People Counting in Extremely Dense Crowds. Proceedings of the 23rd ACM international conference on Multimedia, 2015" by Wang et al. discusses a method of estimating the number of people from an image using a neural network obtained by machine learning. Japanese Patent Application Laid-Open No. 2015-103104 discusses a method of estimating a level of congestion in a wide area by using a headcount result obtained from monitoring images captured by a plurality of cameras. As a method of analyzing a flow of people in an image, Japanese Patent Application Laid-Open No. 2012-22370 discusses a method of determining an unsteady state of a crowd by aggregating different attributes of optical flow. Japanese Patent Application Laid-Open No. 2018-116692 discusses a people flow analysis system using a neural network that receives images of two frames captured at consecutive different times and that estimates the distribution of density of people and the distribution of movement vectors.

However, the methods discussed in the document entitled "Deep People Counting in Extremely Dense Crowds. Proceedings of the 23rd ACM international conference on Multimedia, 2015" by Wang et al. and Japanese Patent Application Laid-Open No. 2015-103104 are both intended to measure the number of people (the number of targets) from the image, and cannot determine the flow of people. The method discussed in Japanese Patent Application Laid-Open No. 2012-22370 determines the flow of people, but the method cannot determine the number of people simultaneously with the flow of people.

The method discussed in Japanese Patent Application Laid-Open No. 2018-116692 determines the flow of people and the number of people simultaneously, but the method cannot determine the flow of people in association with a direction of measuring the number of people passing within a screen.

SUMMARY

An aspect of the disclosure is directed to easily determining the number and the flow of passing targets from a captured image, in association with a measurement direction.

According to an aspect of the disclosure, an image processing apparatus includes an acquisition unit, a setting unit, and a display unit. The acquisition unit is configured to acquire captured time-series images. The setting unit is configured to set a direction of measuring a flow quantity of targets in the time-series images. The display unit is configured to display information representing the flow quantity of the targets that is estimated based on a plurality of images acquired from the time-series images and the direction of measuring the flow quantity, together with information indicating the direction of measuring the flow quantity.

Further features of the disclosure will become apparent from the following description of exemplary embodiments with reference to the attached drawings.

DESCRIPTION OF THE EMBODIMENTS

Figure 1:
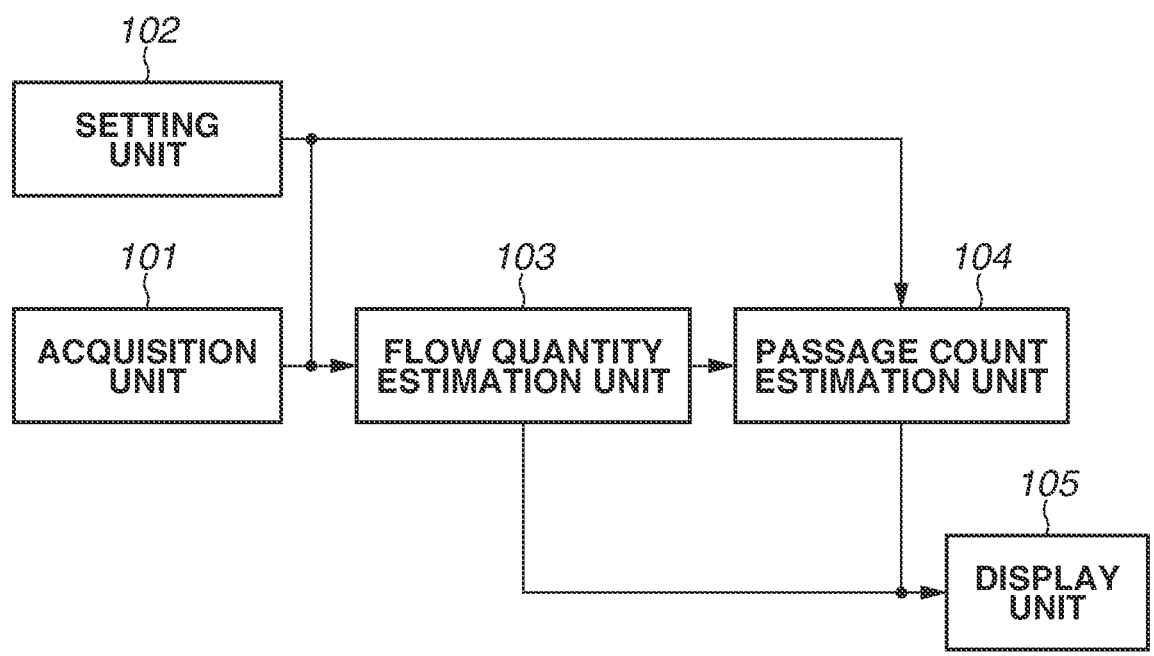
FIG. 1 is a diagram illustrating a functional configuration of an image analysis apparatus according to an exemplary embodiment.

Exemplary embodiments of the disclosure will be described in detail with reference to the attached drawings. Configurations to be described in the following exemplary embodiments are only examples, and the disclosure is not limited to configurations illustrated in the drawings.

FIG. 1 is a diagram illustrating a functional configuration of an image analysis apparatus according to an exemplary embodiment of the disclosure.

As illustrated in FIG. 1, the image analysis apparatus according to the present exemplary embodiment includes an acquisition unit 101, a setting unit 102, a flow quantity estimation unit 103, a passage count estimation unit 104, and a display unit 105, as the functional configuration. Detailed description of the functional configuration in FIG. 1 will be described below.

Figure 2:
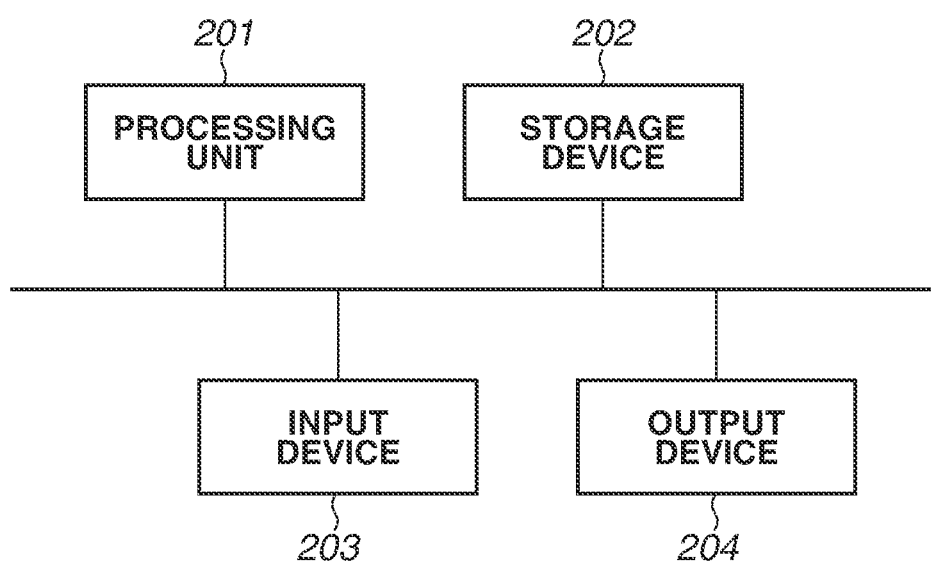
FIG. 2 is a diagram illustrating an example of a hardware configuration of the image analysis apparatus.

FIG. 2 is a diagram illustrating an example of a hardware configuration of the image analysis apparatus according to the present exemplary embodiment.

A processing unit 201 controls operation of the hardware configuration in FIG. 2, and executes a program according to image analysis processing of the present exemplary embodiment, the program being stored in a storage device 202. The processing unit 201 is configured of a central processing unit (CPU) and a graphics processing unit (GPU). The storage device 202 is a device such as a magnetic storage device or a semiconductor memory (e.g., random access memory, read-only memory, flash memory), and stores the program to be read and executed based on operation of the processing unit 201, and data intended to be stored for a long time. In the present exemplary embodiment, the processing unit 201 performs processing in a procedure of the program stored in the storage device 202, so that each function in the image analysis apparatus illustrated in FIG. 1 and processing according to a flowchart to be described below are implemented. The storage device 202 stores an image to be processed by the image analysis apparatus according to the present exemplary embodiment and an analysis result.

An input device 203 includes components such as a mouse, a keyboard, a touch panel device, and a button, and acquires various instructions from a user. The input device 203 also includes an image capturing device such as a camera or an image sensor and acquires an image captured by the image capturing device.

An output device 204 is a device such as a liquid crystal panel or an external monitor, and outputs various kinds of information including an image and a result of image analysis according to the present exemplary embodiment by displaying the information.

The hardware configuration of the image analysis apparatus is not limited to the above-described configuration. For example, the image analysis apparatus may include input/output (I/O) devices for communication between various devices. The I/O devices include a memory card, an input/output unit for a component such as a Universal Serial Bus (USB) cable, and a wired or wireless transmission/reception unit.

The configuration and operation of the image analysis apparatus according to the present exemplary embodiment illustrated in FIG. 1 will be described in detail. The image analysis apparatus according to the present exemplary embodiment has a function of analyzing the flow and the number of targets (e.g., people) in time-series images captured by the camera.

In the image analysis apparatus illustrated in FIG. 1, the acquisition unit 101 acquires image data representing images captured by the camera. The image data is time-series image data.

The setting unit 102 sets a direction of measuring a flow quantity of targets (hereinafter, "flow quantity measurement direction") in the time-series image data acquired by the acquisition unit 101. In the present exemplary embodiment, the setting unit 102 has a function of setting a detection line for measuring a flow quantity of the targets in the flow quantity measurement direction in the time-series images captured by the camera. The flow quantity measurement direction is set in a direction that intersects the direction of the detection line.

The flow quantity estimation unit 103 estimates the distribution of the flow quantity of the targets (human figures) in a flow quantity map, based on image data representing a plurality of images among the time-series image data acquired by the acquisition unit 101, and based on information indicating the flow quantity measurement direction set by the setting unit 102. In the present exemplary embodiment, the flow quantity estimation unit 103 estimates the flow quantity map representing the flow quantity of the targets by using a convolutional neural network, from the plurality of images acquired from the time-series images and the information representing the flow quantity measurement direction. Here, the flow quantity represents the speed, the direction, and the number of the target objects (human figures).

The passage count estimation unit 104 measures the number of people passing the detection line set by the setting unit 102, from the distribution of the flow quantity obtained by the flow quantity estimation unit 103.

The display unit 105 displays the analysis result of the number of people determined by the passage count estimation unit 104, and the flow quantity map estimated by the flow quantity estimation unit 103.

Figure 3:
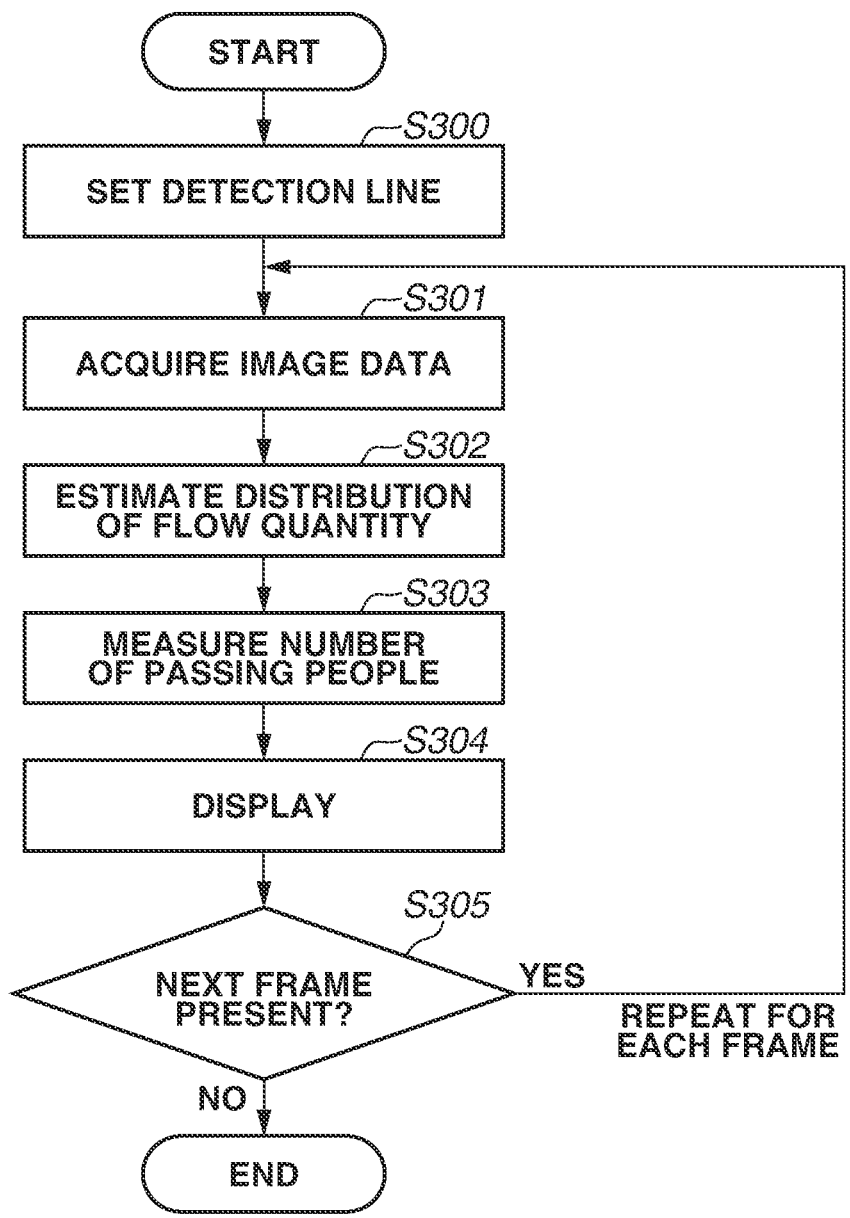
FIG. 3 is a flowchart illustrating a flow of processing by the image analysis apparatus according to the exemplary embodiment.

The operation of the image analysis device according to the present exemplary embodiment will be described with reference to a flow of processing illustrated in a flowchart in FIG. 3. An example will be described below in which analysis processing is performed on a crowd in an image 400 obtained by imaging a predetermined monitoring target area such as an area illustrated in FIG. 4 by using a monitoring camera.

Figure 4:
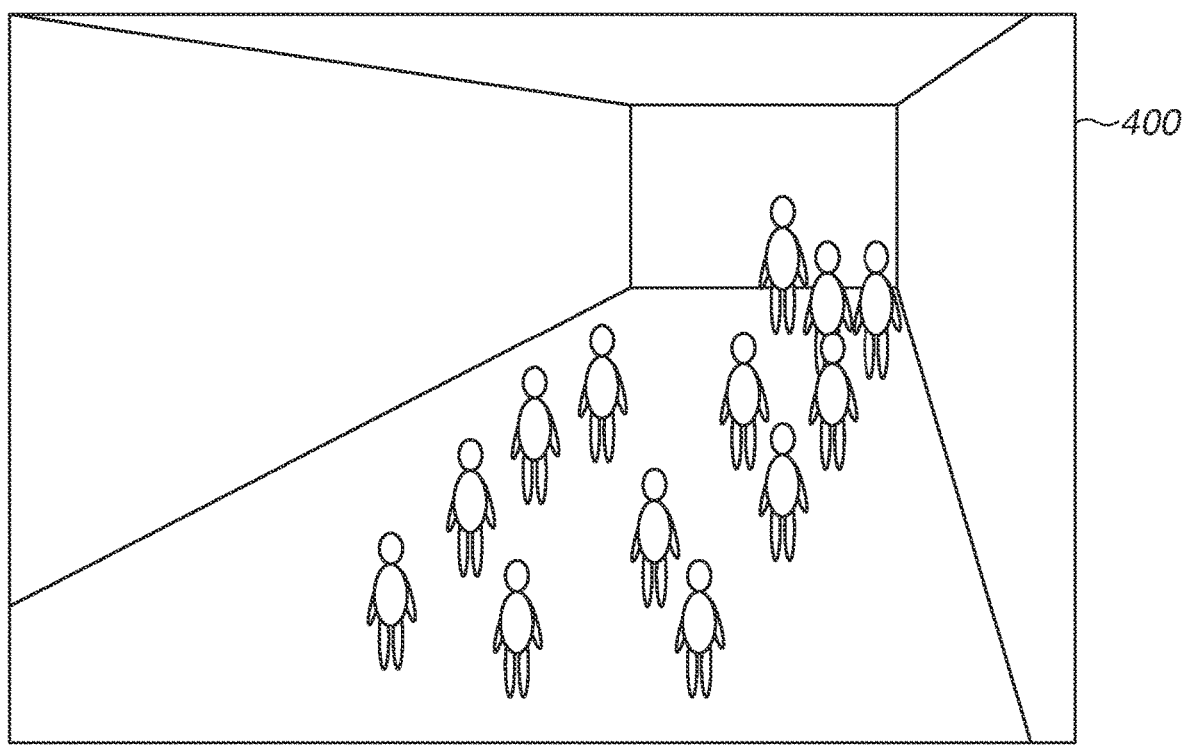
FIG. 4 is a diagram illustrating an example of an image to be subjected to analysis processing.
Figure 5:
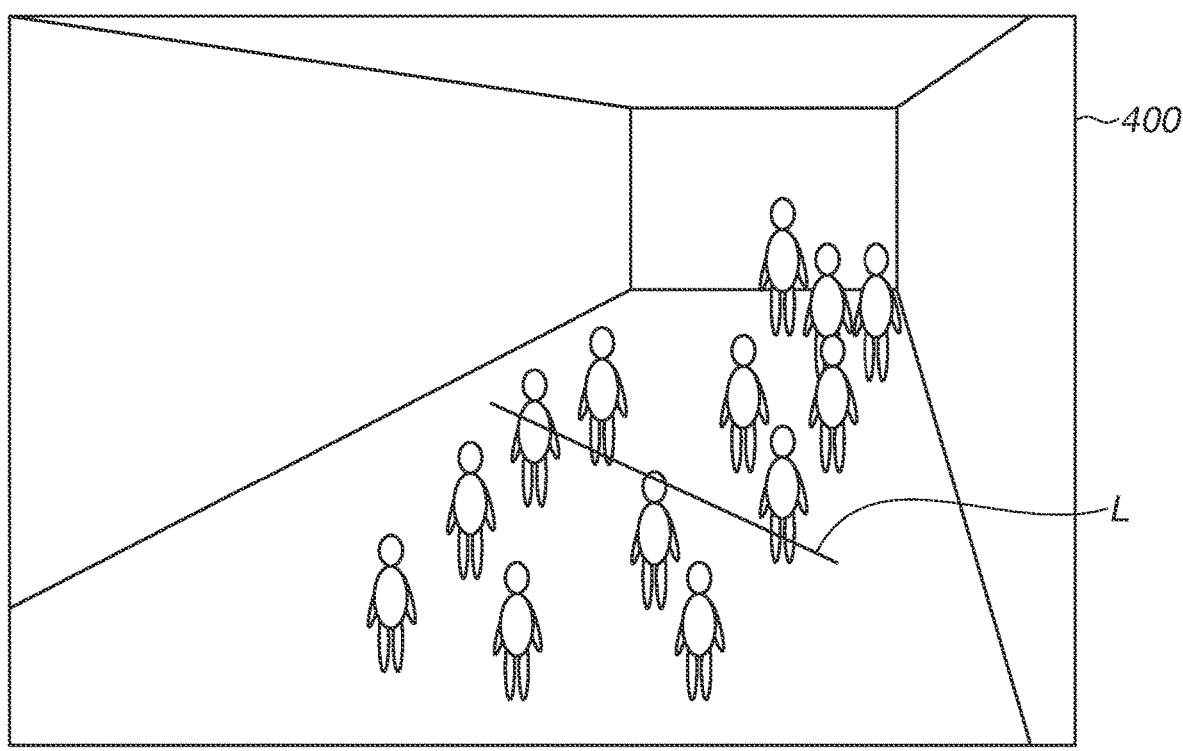
FIG. 5 is a diagram illustrating an example of a detection line.

In step S300, the setting unit 102 sets a detection line in an image captured by the monitoring camera. For example, in a case where the user designates a line segment via a component such as the mouse of the input device 203 in a state where the image 400 illustrated in FIG. 4 is displayed on the output device 204 in FIG. 2, the setting unit 102 sets a detection line corresponding to the line segment designated in the image 400 by the user. FIG. 5 illustrates an example in which a detection line L is set in the image 400 illustrated in FIG. 4. Setting the detection line L is not limited to the method of setting it by the user via the input device 203. For example, the setting unit 102 may detect optical flow from the time-series image data acquired by the acquisition unit 101, determine (estimate) the main direction of human figures moving in the image based on the detected optical flow, and automatically set the detection line based on the main direction. The detection line based on the main direction is set, for example, in a line extending in a direction orthogonal to the main direction. The image analysis apparatus according to the present exemplary embodiment measures the number of people passing the detection line L.

When the setting of the detection line in step S300 is completed, the processing proceeds to step S301 and the subsequent steps to start image analysis in the image analysis apparatus according to the present exemplary embodiment.

In step S301, the acquisition unit 101 acquires image data for each frame captured by the monitoring camera. The image data acquired in this step is two-dimensional data consisting of the pixels of the colors R (red), G (green), and B (blue), a pixel of each color having 8 bits. The acquisition unit 101 sequentially acquires this image data on a time series basis. In the image analysis apparatus according to the present exemplary embodiment, step S301 to step S304 in FIG. 3 are repeated for each of the acquired frames.

Subsequently, in step S302, the flow quantity estimation unit 103 estimates the distribution of a flow quantity of human figures in the image, from the plurality of pieces of image data acquired by the acquisition unit 101 and the information indicating the flow quantity measurement direction set by the setting unit 102. In the present exemplary embodiment, the flow quantity estimation unit 103 receives image data representing two consecutive frames and the information indicating the flow quantity measurement direction (the direction intersecting the detection line) set by the setting unit 102. Further, the flow quantity estimation unit 103 estimates a flow quantity of passing human figures in the flow quantity measurement direction in a flow quantity map, and outputs the flow quantity map.

In a method of estimating the passage flow quantity, a deep neural network such as the one discussed in the paper entitled "Walach E., Wolf L. (2016) Learning to Count with CNN Boosting. In: Leibe B., Matas J., Sebe N., Welling M. (eds) Computer Vision—ECCV 2016. Lecture Notes in Computer Science, vol 9906. Springer, Cham" can be applied. As discussed in the paper, density distribution of human figures is output in response to input of one image, using a neural network obtained beforehand by machine learning. The density distribution can be obtained using another type of neural network. The method is applied to the present exemplary embodiment. Specifically, a neural network that receives two consecutive frames and a flow quantity measurement direction and that estimates a passage flow quantity of human figures in the flow quantity measurement direction in the image is trained beforehand, and the trained neural network is used for the estimation. Training targets are the speed of moving people based on the input of the images of the two frames that are an image captured at a time t and an image captured at a time t+1, and the direction of the moving people based on the input of the flow quantity measurement direction. Velocity can be obtained from the speed and the direction. The passage flow quantity can be estimated from density and the velocity.

Figure 6:
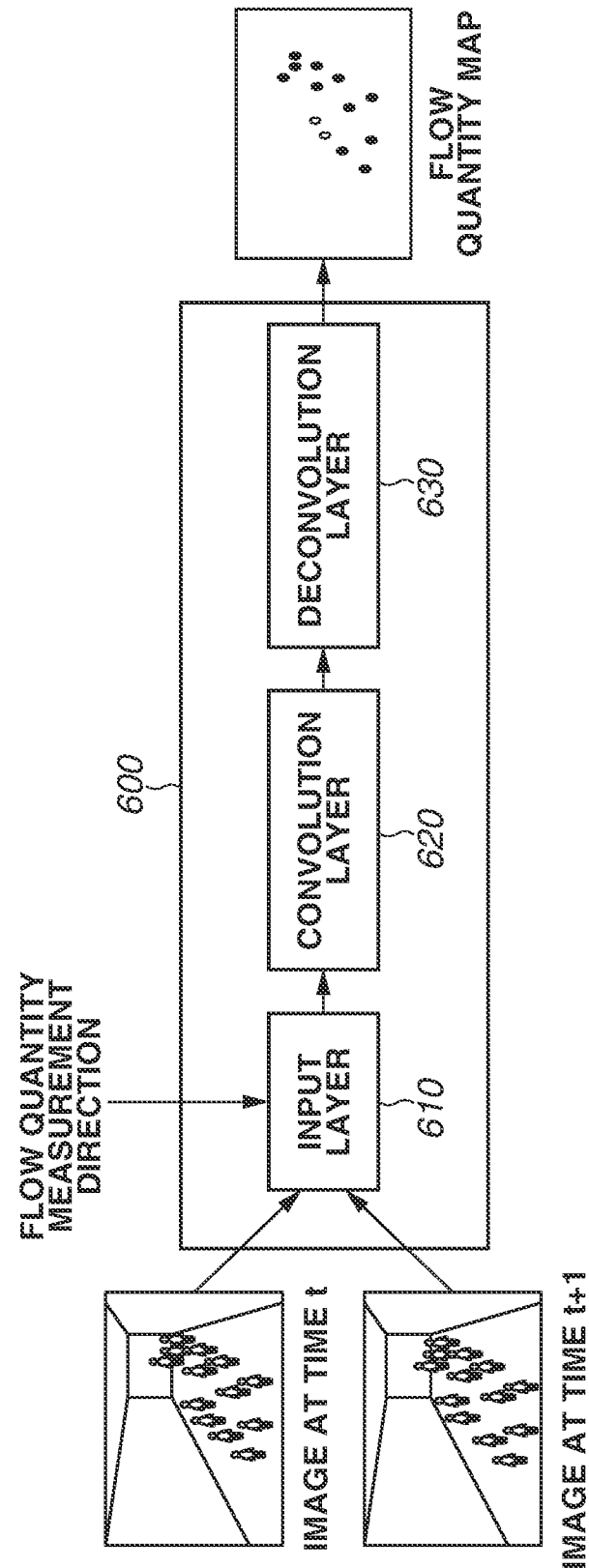
FIG. 6 is a diagram illustrating a configuration of a neural network of a flow quantity estimation unit.

FIG. 6 is a diagram illustrating a configuration example of a neural network 600.

An input layer 610 in FIG. 6 configures input data of 8 channels. This input data links each of the two-dimensional arrays of RGB data of the image captured at the time t and the image captured at the subsequent time t+1, and the two-dimensional array of the data obtained by expanding horizontal and vertical direction components of the unit vector representing the flow quantity measurement direction. A convolution layer 620 receives the input data from the input layer 610, and repeats a two-dimensional convolution operation, a non-linear transformation, and a pooling process, a predetermined number of times. The two-dimensional convolution operation is performed using filters obtained by pre-training, so that a feature map of a predetermined number of channels is obtained. The non-linear transformation uses a rectified linear unit (ReLU), for example. The pooling process reduces the size of the feature map to a half vertically and horizontally, by calculating a maximum value or average value of adjacent 2×2 data in the feature map obtained by the two-dimensional convolution operation. A deconvolution layer 630 receives the feature map obtained in the convolution layer 620, and performs a two-dimensional deconvolution operation and a non-linear transformation a predetermined number of times. The two-dimensional deconvolution operation is performed using filters obtained by pre-training, so that a feature map of a predetermined number of channels is obtained. The size of the feature map obtained at this stage is twice the original feature map. This neural network is trained using images of two consecutive frames as training data. A passing flow quantity in the flow quantity measurement direction in the images is determined beforehand.

In a flow quantity map output by the neural network 600 in FIG. 6, a dark round mark (a negative value as an output value) represents a flow quantity of targets (people) passing in the direction from the back to the front in the image relative to the detection line. For example, a darker round mark indicates a larger flow quantity, whereas a lighter round mark indicates a smaller flow quantity. In contrast, a white round mark (a positive value as an output value) represents a flow quantity of targets (people) passing in the direction from the front to the back in the image relative to the detection line. The position of a round mark in the flow quantity map corresponds to the head portion of a person detected from the input data. Each of the round marks is not a dot, but a circle having a size.

In the present exemplary embodiment, the image data acquired by the acquisition unit 101 is directly input into the neural network 600. Alternatively, the image data may be input after being reduced in size, or after the pixel values of the image data being normalized to a range of [−1, 1]. Alternatively, the following may be performed: the image data acquired by the acquisition unit 101 is divided into subregions, the divided subregion data is input into the neural network 600, the distribution of a flow quantity—is estimated from the data of each input subregion, and the estimated distributions of the flow quantities are integrated.

In step S303, the passage count estimation unit 104 measures the number of people passing the detection line set by the setting unit 102, from the distribution of the flow quantity obtained by the flow quantity estimation unit 103.

Figure 7:
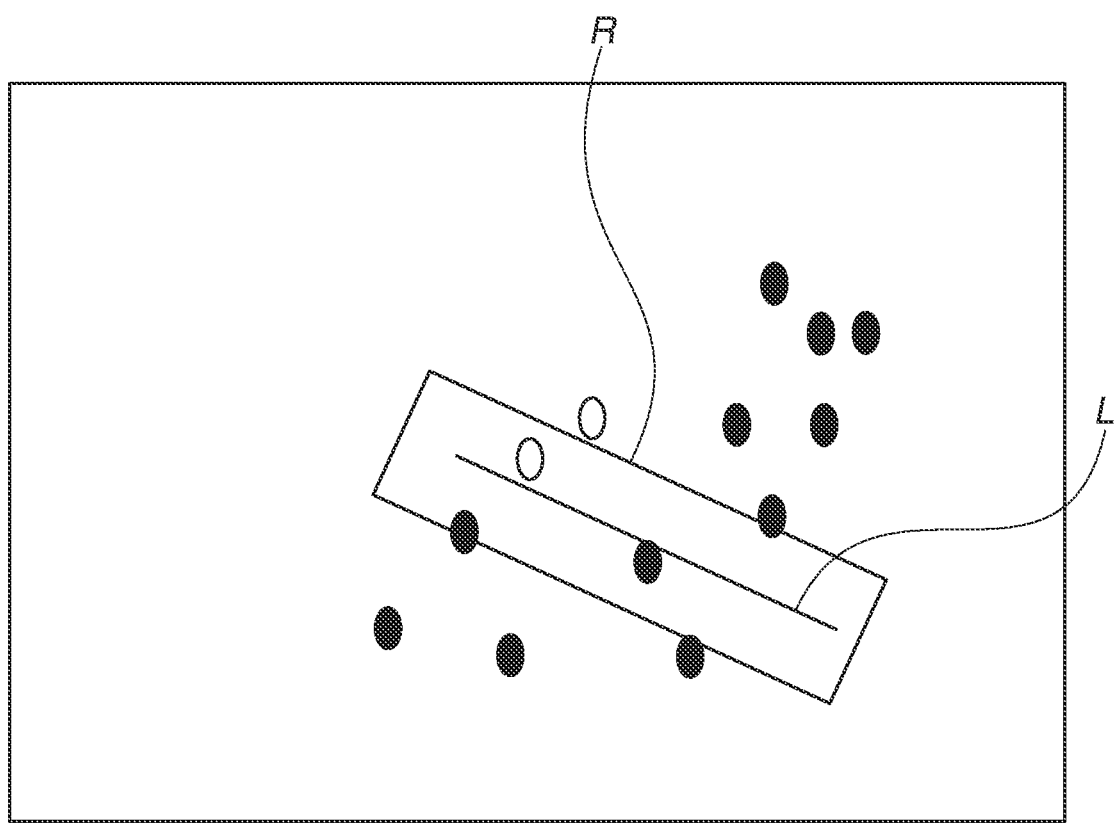
FIG. 7 is a diagram illustrating processing by a passage count estimation unit.

The processing by the passage count estimation unit 104 will be described with reference to FIG. 7.

First, the passage count estimation unit 104 sets a rectangle R surrounding the detection line L. The rectangle R is parallel with the detection line L and longer in the line direction. From the distribution of the flow quantity obtained by the flow quantity estimation unit 103, the passage count estimation unit 104 calculates the sum total of the absolute values of the negative values and the sum total of the absolute values of the positive values among the values within the rectangle R. The passage count estimation unit 104 performs normalization processing appropriate to the width of the rectangle R, on the sum total of the absolute values of the negative values and the sum total of the absolute values of the positive values. The former is determined to be the number of people passing the detection line L from the back to the front in the image, and the latter is determined to be the number of people passing the detection line L from the front to the back in the image.

In step S304, the display unit 105 displays a numerical value (not illustrated) representing the number of passing people as the analysis result of the number of passing people determined by the passage count estimation unit 104, and the flow quantity map estimated by the flow quantity estimation unit 103. The analysis result of the number of passing people displayed here is the number of people passing the detection line of each frame from the back to the front in the image, and the number of people passing the detection line from the front to the back in the image. The display unit 105 calculates the cumulative number of people since the time the image analysis has started, and also displays the calculated cumulative number of people. The display unit 105 displays the flow quantity map illustrated in FIG. 6 on the output device 204. In the image analysis apparatus according to the present exemplary embodiment, by displaying the flow quantity map estimated using the neural network thus, the user can easily determine behavior of a human figure such as a movement in the direction opposite to the direction of the flow of a crowd relative to the detection line.

In step S305, the acquisition unit 101 determines whether the next processing target frame is present. If the next frame is present (YES in step S305), the processing returns to step S301. Then, the image analysis apparatus repeats step S302 to step S305 thereafter in a manner similar to the manner described above, for the image of each frame acquired in step S301.

As described above, in the image analysis apparatus according to the present exemplary embodiment, the flow quantity map representing the flow quantity of the targets is estimated using the convolutional neural network, from the plurality of images acquired from the time-series images and the flow quantity measurement direction corresponding to the detection line. This enables the user of the image analysis apparatus according to the present exemplary embodiment to obtain the information representing the flow of people passing within the screen and the number of people, from the estimated flow quantity map. The user can easily determine the flow of people relative to the detection line by displaying the estimated flow quantity map. For the number of passing people, the user can determine the number of passing people relative to the detection line by the number of people being determined from the flow quantity map in step S303 and then the determined number of people being displayed in step S304.

In the present exemplary embodiment described above, the flow quantity estimation unit 103 employs the neural network that receives the two-dimensional arrays representing the images of two frames and the flow quantity measurement direction corresponding to the detection line, but other configuration may be adopted.

For example, the neural network may be configured to generate a filter that estimates the optimum flow quantity relative to the flow quantity measurement direction corresponding to the detection line. This type of neural network can be configured using a filter-manifold network (FMN) discussed in the paper entitled "Incorporating Side Information by Adaptive Convolution. Electronic Proceedings of the Neural Information Processing Systems Conference. Advances in Neural Information Processing Systems 30 (NIPS 2017)" by Kang et al. In the paper, the number of people is estimated by training the FMN to generate a filter corresponding to camera orientation information in a neural network that estimates the number of a crowd.

Figure 8:
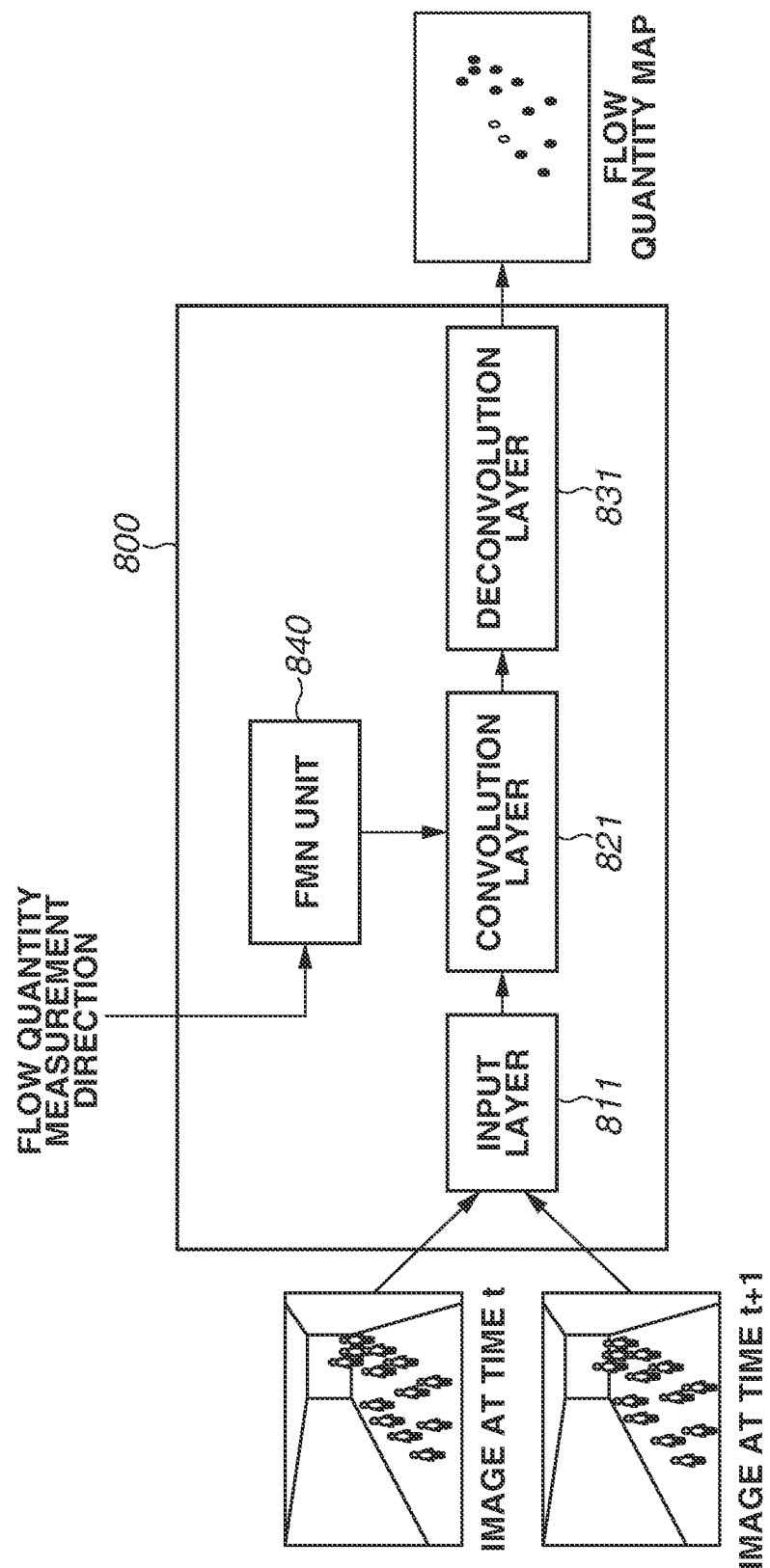
FIG. 8 is a diagram illustrating another configuration example of the neural network of the flow quantity estimation unit.

FIG. 8 is a diagram illustrating a configuration example of a neural network 800 that estimates a flow quantity using the FMN. In FIG. 8, an input layer 811, a convolution layer 821, and a deconvolution layer 831 are similar to the input layer 610, the convolution layer 620, and the deconvolution layer 630, respectively, of the neural network 600 illustrated in FIG. 6, in terms of configuration and function.

The input layer 811 configures input data of 6 channels from the two-dimensional arrays of RGB data of the image captured at the time t and the image captured at the subsequent time t+1. An FMN unit 840 receives the unit vector representing the flow quantity measurement direction corresponding to the detection line and thereby generates a weight coefficient of a filter in a two-dimensional convolution operation using a plurality of fully connected layers. In the last layer of the convolution layer 821, the two-dimensional convolution operation is performed using the filter generated by the FMN unit 840, and a feature map determined thereby is output to the deconvolution layer 831. The FMN unit 840 is trained beforehand using a neural network that estimates a passing flow quantity for each of flow quantity measurement directions, and the FMN unit 840 determines a coefficient of the fully connected layer to generate a filter obtained by the training.

Having such a configuration enables the neural network 800 in FIG. 8 to reduce the number of channels from 8 channels to 6 channels for the input layer 811 and thus reduce the throughput of the convolution operation, in comparison with the neural network 600 illustrated in FIG. 6. The weight coefficient of the filter for the convolution operation is generated from a unit vector that is an input of the FMN unit 840, and therefore the number of channels of the input layer 811 can be smaller by 2 channels than that of the neural network 600 illustrated in FIG. 6. In FIG. 6, the input layer 610 is assigned 2 channels of the information about the flow quantity measurement direction, and the neural network is trained based on the flow quantity measurement direction. The FMN may be applied to a plurality of convolution layers as discussed in the document: "Incorporating Side Information by Adaptive Convolution. Electronic Proceedings of the Neural Information Processing Systems Conference. Advances in Neural Information Processing Systems 30 (NIPS 2017)" by Kang et al. The FMN may be applied to the deconvolution layer.

Figure 9:
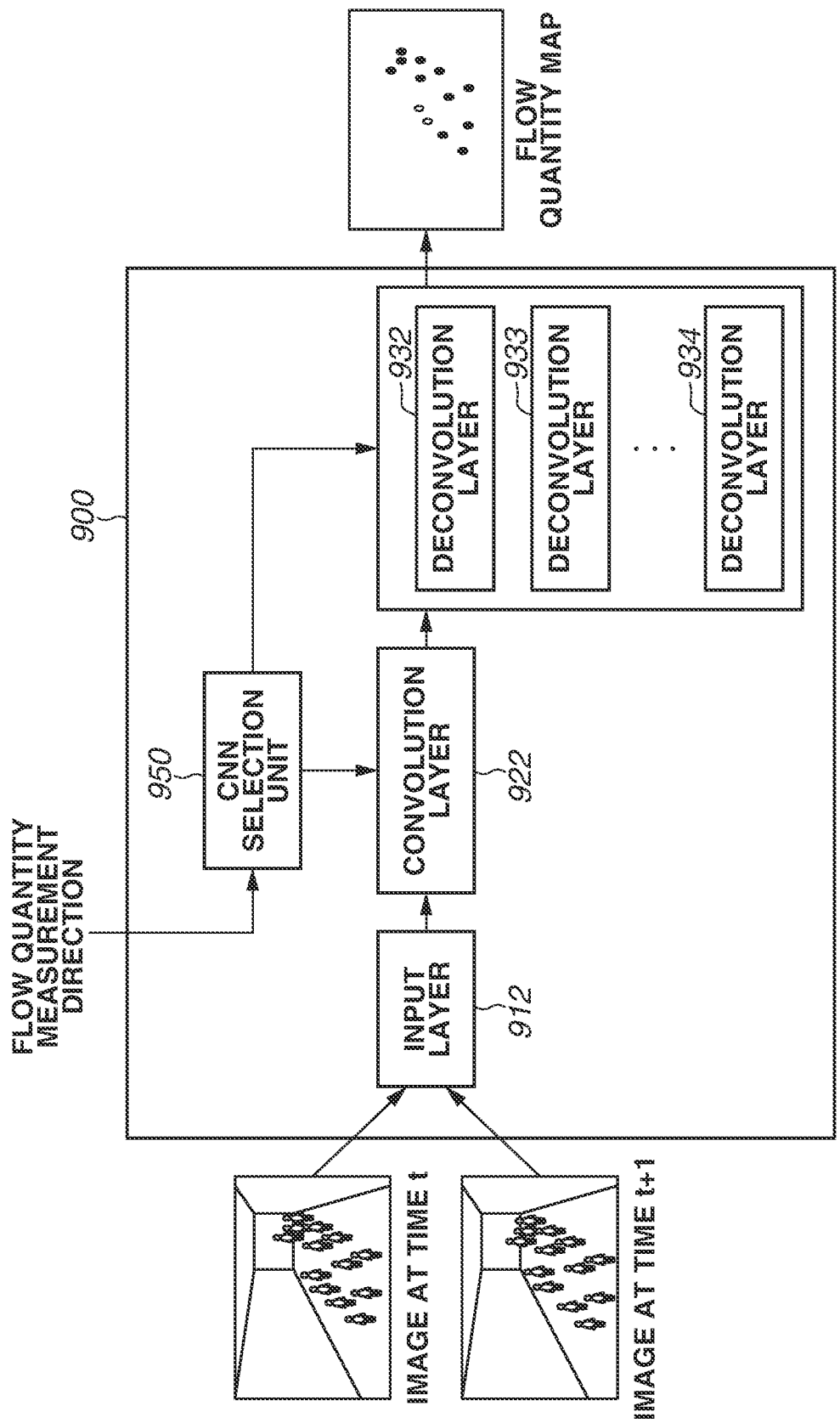
FIG. 9 is a diagram illustrating another configuration example of the neural network of the flow quantity estimation unit.

FIG. 9 is a diagram illustrating another configuration example of the flow quantity estimation unit 103. In the example in FIG. 9, the configuration includes a plurality of deconvolution layers to estimate a flow quantity using the optimum deconvolution layer based on a flow quantity measurement direction. In FIG. 9, an input layer 912 and a convolution layer 922 are similar to the input layer 610 and the convolution layer 620, respectively, of the neural network 600 illustrated in FIG. 6, in terms of configuration and function.

The input layer 912 configures input data of 6 channels from the two-dimensional arrays of RGB data of the image captured at the time t and the image captured at the subsequent time t+1. The convolution layer 922 performs a two-dimensional convolution operation, and thereby outputs a feature map. Each of the deconvolution layers 932, 933, and 934 is similar to the deconvolution layer 630 of the neural network 600 illustrated in FIG. 6, in terms of configuration and function. The deconvolution layers 932, 933, and 934 each perform a two-dimensional deconvolution operation using a filter coefficient of the two-dimensional convolution operation obtained by pre-training for a flow quantity measurement direction corresponding to a specific detection line. The training method is, for example, a method of training the convolution layer 922 and the deconvolution layer 932 using training data of a flow quantity measurement direction (e.g., a horizontal detection line) serving as a reference, and then the deconvolution layers 933 and 934 are sequentially trained for other directions. A CNN selection unit 950 selects the optimum deconvolution layer based on the flow quantity measurement direction. Here, because the number of the deconvolution layers is limited, the CNN selection unit 950 selects the optimum deconvolution layer corresponding to the closest flow quantity measurement direction of the flow quantity measurement directions optimized by the respective deconvolution layers 932, 933, and 934 in training. In the example in FIG. 9, the plurality of deconvolution layers is provided and the selection is made depending on the flow quantity measurement direction, but a plurality of convolution layers may be provided.

In the present exemplary embodiment, the input to the convolutional neural network that estimates the flow quantity of human figures is the images of two consecutive frames, but a predetermined number of consecutive images of three or more frames may be input. The above-described configuration of the neural network used for the flow quantity estimation unit is an example, and a neural network having another configuration may be used.

In the present exemplary embodiment, the case where the flow of people in the image is analyzed from the images captured by the camera is described as an example, but the targets of the analysis may be objects other than human figures (e.g., vehicles or animals). The present exemplary embodiment is applicable to a wide range of analyses of flows of various targets.

In the image analysis apparatus according to the present exemplary embodiment, the detection line is set and the flow quantity measurement direction for the targets is set, and further, the flow quantity map representing the flow quantity of the targets is estimated using the convolutional neural network, from the plurality of images acquired from the time-series images and the flow quantity measurement direction. Thus, according to the image analysis apparatus of the present exemplary embodiment, the objects (the number of people) passing within the screen can be easily determined.

In the above-described image analysis apparatus, the flow quantity estimation unit 103 estimates the flow quantity using the neural network, but other units may perform processing to which artificial intelligence (AI) is applied as well. For example, the setting unit 102 and/or the passage count estimation unit 104 may also perform the processing to which AI is applied. In place of each of these units, for example, a trained model obtained by machine learning may be used. In that case, a plurality of combinations of input data and output data for each of those units is prepared as training data, and knowledge is acquired from those combinations by machine learning, and further, a trained model is generated that outputs output data in response to input data as the result based on the acquired knowledge. This trained model can be, for example, configured of a neural network model. Those trained models each operate in corporation with a unit such as a CPU and a GPU, as a program for performing processing equivalent to that of the corresponding one of the above-described units. The above-described trained model can also be updated each time a certain amount of data is processed where appropriate.

According to the exemplary embodiment of the disclosure, the number and the flow of passing targets can be easily determined from a captured image, in association with a measurement direction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The functions may correspond to methods, subprograms, or modules that implement the operational units (e.g., acquisition unit, setting unit, and display unit) to perform the corresponding operations. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-167189, filed Sep. 13, 2019, which is hereby incorporated by reference herein in its entirety.

What is claimed is:

1. An image processing apparatus comprising:
one or more processors; and
one or more memories storing instructions that, when executed by the one or more processors, cause the one or more processors to be configured to operate as:
an acquisition unit configured to acquire time-series images captured by an image sensor;
a setting unit configured to set a direction of a detection line for measuring a flow quantity of targets, and set a direction of measuring the flow quantity of the targets in the time-series images in a direction intersecting the direction of the detection line;
a flow quantity estimation unit configured to estimate information representing the flow quantity of the targets based on a plurality of images acquired from the time-series images and the direction of measuring the flow quantity;
a passage count estimation unit configured to measure a number of people passing the detection line set by the setting unit based on the flow quantity of the targets estimated by the flow quantity estimation unit; and
a display control unit configured to control a display to display the information representing the flow quantity of the targets and the number of people passing the detection line that is estimated based on the plurality of images acquired from the time-series images and the direction of measuring the flow quantity of the targets, together with information indicating the direction of measuring the flow quantity of the targets,
wherein the flow quantity estimation unit estimates the information representing the flow quantity of the targets with a convolutional neural network having convolutional layers and deconvolutions layers, and
wherein the neural network is configured to receives the information on the direction of measuring the flow quantity of the targets, and determine a weight coefficient for the convolution layers based on the information on the direction of measuring the flow quantity of the targets, at least one of the convolution layers generating a feature map, and
wherein a deconvolution layer is selected among the deconvolution layers to perform a deconvolution on the feature map to generate the flow quantity.

2. The image processing apparatus according to claim 1, wherein the information representing the flow quantity of the targets comprises distribution of the flow quantity of the targets, the distribution being estimated by inputting the plurality of images acquired from the time-series images, and the direction of measuring the flow quantity of the targets, into the convolutional neural network.

3. The image processing apparatus according to claim 1, wherein the one or more processors are further configured to operate as a measurement unit configured to measure a number of the targets passing a detection line for measuring the flow quantity of the targets, based on the estimated information representing the flow quantity and the detection line,
   wherein the setting unit sets the detection line in the direction of measuring the flow quantity.

4. The image processing apparatus according to claim 1, wherein the setting unit determines a main direction of movement of the targets by detecting optical flow from the time-series images, and sets the direction of measuring the flow quantity based on the main direction.

5. The image processing apparatus according to claim 1, wherein the one or more memories and one or more processors are further configured to operate as a generation unit configured to generate a map representing distribution of the flow quantity of the targets,
   wherein the display unit displays the map as the information representing the flow quantity of the targets.

6. The image processing apparatus according to claim 1, wherein the one or more processors are further configured to operate as an estimation unit configured to estimate the information representing the flow quantity of the targets based on the plurality of images acquired from the time-series images and the direction of measuring the flow quantity,
   wherein the display unit displays the information representing the flow quantity of the targets estimated by the estimation unit, together with the information indicating the direction of measuring the flow quantity.

7. The image processing apparatus according to claim 1, wherein the setting unit sets the direction of measuring the flow quantity of the targets, based on a line segment input in the image by a user.

8. The image processing apparatus according to claim 6, wherein the estimation unit estimates distribution of the flow quantity of the targets, using a size-reduced image or a normalized image of the image acquired from the time-series images.

9. The image processing apparatus according to claim 6, wherein the estimation unit estimates distribution of the flow quantity of the targets, by the image acquired from the time-series images being divided into subregions, flow quantities being estimated for the respective subregions, and the estimated flow quantities being integrated.

10. An image processing method to be executed by an image processing apparatus, the image processing method comprising:
    acquiring time-series images captured by an image sensor;
    setting a direction of a detection line for measuring a flow quantity of targets;
    setting a direction of measuring the flow quantity of the targets in the time-series images in a direction intersecting the direction of the detection line;
    estimating information representing the flow quantity of the targets based on a plurality of images acquired from the time-series images and the direction of measuring the flow quantity;
    measuring a number of people passing the detection line based on the estimated flow quantity of the targets; and
    controlling a display to display the information representing the flow quantity of the targets and the number of people passing the detection line that is estimated based on the plurality of images acquired from the time-series images and the direction of measuring the flow quantity of the targets, together with information indicating the direction of measuring the flow quantity of the targets,
    wherein estimating information representing the flow quantity comprises:
       estimating the information representing the flow quantity of the targets with a convolution neural network having convolutional layers and deconvolutions layers, and
       receiving the information on the direction of measuring the flow quantity of the targets, and determining a weight coefficient for the convolution layers based on the information on the direction of measuring the flow quantity of the targets, at least one of the convolution layers generating a feature map, and
       selecting a deconvolution layer among the deconvolution layers to perform a deconvolution on the feature map to generate the flow quantity.

11. The image processing method according to claim 10, further comprising measuring a number of the targets passing a detection line for measuring the flow quantity of the targets, based on the estimated information representing the flow quantity and the detection line,
    wherein the detection line is set in the direction of measuring the flow quantity.

12. The image processing method according to claim 10, wherein a main direction of movement of the targets is determined by optical flow being detected from the time-series images, and the direction of measuring the flow quantity is set based on the main direction.

13. The image processing method according to claim 10, further comprising generating a map representing distribution of the flow quantity of the targets,
    wherein the map is displayed as the information representing the flow quantity of the targets.

14. The image processing method according to claim 10, further comprising estimating the information representing the flow quantity of the targets based on the plurality of images acquired from the time-series images and the direction of measuring the flow quantity,
    wherein the estimated information representing the flow quantity of the targets is displayed together with the information indicating the direction of measuring the flow quantity.

15. The image processing method according to claim 10, wherein the direction of measuring the flow quantity of the targets is set based on a line segment input in the image by a user.

16. The image processing method according to claim 14, wherein distribution of the flow quantity of the targets is estimated using a size-reduced image or a normalized image of the image acquired from the time-series images.

17. The image processing method according to claim 14, wherein distribution of the flow quantity of the targets is estimated by the image acquired from the time-series images being divided into subregions, flow quantities being estimated for the respective subregions, and the estimated flow quantities being integrated.

18. A non-transitory computer-readable storage medium storing computer-executable instructions for causing a computer to perform a method comprising:
    acquiring time-series images captured by an image sensor;
    setting a direction of a detection line for measuring a flow quantity of targets;

setting a direction of measuring a the flow quantity of the targets in the time-series images in a direction intersecting the direction of the detection line;

estimating information representing the flow quantity of the targets based on a plurality of images acquired from the time-series images and the direction of measuring the flow quantity;

measuring a number of people passing the detection line based on the estimated flow quantity of the targets; and controlling a display to display the information representing the flow quantity of the targets and the number of people passing the detection line that is estimated based on the plurality of images acquired from the time-series images and the direction of measuring the flow quantity of the targets, together with information indicating the direction of measuring the flow quantity of the targets, wherein estimating information representing the flow quantity comprises:

estimating the information representing the flow quantity of the targets with a convolution neural network having convolutional layers and deconvolutions layers, and receiving the information on the direction of measuring the flow quantity of the targets, and determining a weight coefficient for the convolution layers based on the information on the direction of measuring the flow quantity of the targets, at least one of the convolution layers generating a feature map, and selecting a deconvolution layer among the deconvolution layers to perform a deconvolution on the feature map to generate the flow quantity.

19. The image processing apparatus according to claim 1, wherein the flow quantity estimation unit receives the information on the direction of measuring the flow quantity of the targets as a two-dimensional array of data obtained by expanding horizontal and vertical direction components of the unit vector representing the flow quantity measurement direction.

20. The image processing apparatus according to claim 1, wherein the selection unit selects the deconvolution layer based on the information on the direction of measuring the flow quantity of the targets.

* * * * *